(12) United States Patent
Massicot et al.

(10) Patent No.: US 8,910,859 B2
(45) Date of Patent: Dec. 16, 2014

(54) METHODS AND DEVICES FOR MARKING AND AUTHENTICATING A PRODUCT BY A CONSUMER

(75) Inventors: Jean Pierre Massicot, Rueil-Malmaison (FR); Alain Foucou, Rueil-Malmaison (FR); Zbigniew Sagan, Rueil-Malmaison (FR)

(73) Assignee: Advanced Track & Trace, Rueil-Malmaison Cedex (FR)

( * ) Notice: Subject to any disclaimer, the term of this patent is extended or adjusted under 35 U.S.C. 154(b) by 75 days.

(21) Appl. No.: 13/810,564

(22) PCT Filed: Jul. 19, 2011

(86) PCT No.: PCT/FR2011/051727
§ 371 (c)(1),
(2), (4) Date: Jan. 16, 2013

(87) PCT Pub. No.: WO2012/017161
PCT Pub. Date: Feb. 9, 2012

(65) Prior Publication Data
US 2013/0200144 A1 Aug. 8, 2013

(30) Foreign Application Priority Data
Jul. 19, 2010 (FR) .................................... 10 55826

(51) Int. Cl.
| | |
|---|---|
| *G06F 17/00* | (2006.01) |
| *G07D 7/00* | (2006.01) |
| *G06K 7/10* | (2006.01) |
| *G06K 9/00* | (2006.01) |
| *G06F 17/30* | (2006.01) |
| *G06K 7/14* | (2006.01) |
| *G06K 5/00* | (2006.01) |
| *G06K 9/62* | (2006.01) |
| *G07D 7/20* | (2006.01) |

(52) U.S. Cl.
CPC .......... *G06K 7/10861* (2013.01); *G07D 7/0026* (2013.01); *G06K 9/00577* (2013.01); *G06F 17/30244* (2013.01); *G06K 7/1417* (2013.01); *G07D 7/0033* (2013.01); *G06K 5/00* (2013.01); *G06K 9/6277* (2013.01); *G07D 7/2033* (2013.01)
USPC .......................................................... 235/375

(58) Field of Classification Search
CPC .............. G06F 17/30244; G06K 5/00; G06K 7/10861; G06K 7/1417; G06K 9/00577; G06K 9/6277; G07D 7/0026; G07D 7/0033; G07D 7/2033
USPC ............. 235/375, 435, 437, 462.01, 470, 494
See application file for complete search history.

(56) References Cited

U.S. PATENT DOCUMENTS

| | | | |
|---|---|---|---|
| 6,871,789 B2 * | 3/2005 | Hilton et al. ................... | 235/494 |
| 2012/0327450 A1 | 12/2012 | Sagan et al. | |

FOREIGN PATENT DOCUMENTS

| | | |
|---|---|---|
| DE | 102 24 256 A1 | 12/2003 |
| EP | 1 672 593 A2 | 6/2006 |
| WO | 2008/009826 A2 | 1/2008 |

OTHER PUBLICATIONS

International Search Report, dated Nov. 22, 2011, from corresponding PCT application.

*Primary Examiner* — Seung Lee
(74) *Attorney, Agent, or Firm* — Young & Thompson

(57) ABSTRACT

The method for marking a product includes:
a step of forming, on or in the product, a mark robust to copying, with a first resolution,
a step of forming, on or in the product, a mark sensitive to copying, with a second resolution higher than the first resolution,
a step of capturing an image of the robust mark, the sensitive mark and another part of the product and
a step of memorizing an item of information representing the image of the robust mark, the sensitive mark and the other image part. In embodiments, during at least one forming step, the position of the mark formed during this forming step is random in relation to the other image part.

16 Claims, 8 Drawing Sheets

METHODS AND DEVICES FOR MARKING AND AUTHENTICATING A PRODUCT BY A CONSUMER

BACKGROUND OF THE INVENTION

1. Field of the Invention

This invention concerns a method and a device for marking products and a method and a device for authenticating a product by a consumer. It applies to all types of product, with or without packaging.

2. Description of the Related Art

The product authentication devices known from the prior art are reserved for professionals equipped with expensive special equipment. It is not therefore possible for a consumer to check the authenticity of a product before purchasing it, e.g. in a store, or consuming it, e.g. at the restaurant. The counterfeiting of expensive products, especially alcohols, medicines and perfumes, thus expands easily.

BRIEF SUMMARY OF THE INVENTION

The present invention aims to remedy all or part of these drawbacks.

To this end, according to a first aspect, the present invention envisages a method for marking a product that comprises:
- a step of forming, on or in said product, a mark robust to copying, with a first resolution,
- a step of forming, on or in said product, a mark sensitive to copying, with a second resolution higher than the first resolution,
- a step of capturing an image of said robust mark, said sensitive mark and another part of the product and
- a step of memorizing an item of information representing the image of said robust mark, said sensitive mark and said other image part.

Thanks to these provisions, even if illegally copied, the product can be identified thanks to the robust mark and authenticated thanks, firstly, to the sensitive mark and, secondly, to the image of the part of the product. In this way, destruction or alteration of the sensitive mark does not prevent the product's authentication. In addition, by comparing the information representing the memorized image with an item of information representing an image captured by a mass-market image sensor, the product can be authenticated even if the image quality does not allow processing of the sensitive mark.

This invention thus enables the authentication of products by a consumer equipped with a communicating mobile terminal, e.g. a personal digital assistant or a mobile telephone, with an image sensor or camera.

According to particular features, during at least one forming step, the position of the mark formed during this forming step is random in relation to the other image part.

Thanks to these provisions, geometric characteristics between the positions of the robust mark, the sensitive mark and the other part of the product thus make it possible to authenticate the product.

According to particular features, said robust mark is a two-dimensional bar code.

For example, this two-dimensional bar code is a DataMatrix (registered trademark). In this way, a large quantity of information can be stored on the product (for example, the name of its manufacturer and the place and date of manufacture).

According to particular features, said mark sensitive to copying is a digital authentication code, the method that is the subject of the present invention comprises a step of determining an item of information representing print errors for said mark sensitive to copying and, during the memorization step, said item of information representing print errors is memorized.

According to particular features, during each of the steps of forming marks, the position of said mark in relation to an element of the product is variable and, during the step of capturing an image, an image of said element is captured.

According to particular features, during the steps of forming marks, the marks formed are offset differently for two different products.

According to a second aspect, this invention envisages a product marking device that comprises:
- a means of forming, on or in said product, a mark robust to copying, with a first resolution,
- a means of forming, on or in said product, a mark sensitive to copying, with a second resolution higher than the first resolution,
- an image sensor designed to capture an image of said robust mark, said sensitive mark and another part of the product and
- a means of memorizing an item of information representing the image of said robust mark, said sensitive mark and said other image part.

According to a third aspect, this invention envisages a product authentication method that comprises:
- a step of capturing, on said product, an image of a robust mark and a mark sensitive to copying with a higher resolution than the robust mark, and another part of the product,
- a step of transmitting an item of information representing the image of said robust mark, said sensitive mark and said other image part,
- a step of comparing said item of information representing the image of said robust mark, said sensitive mark and said other image part with at least one remote memorized item of information and
- depending on the result of said comparison step, a step of displaying data relating to the product, an image of which was captured.

In embodiments, during the comparison step, one performs first of all a step of determining the quality of the image of the mark sensitive to copying and:
- if the quality is higher than a predefined value, a comparison of an item of information representing the mark sensitive to copying or,
- if not, a comparison of an item of information representing the other part of the product.

In this way, even if the quality of image of the mark sensitive to copying is insufficient, for example due to the image capture equipment or conditions, the authenticity of the product can nevertheless be estimated.

According to a fourth aspect, this invention envisages a product authentication device that comprises:
- a means of capturing, on said product, an image of a robust mark and a mark sensitive to copying with a higher resolution than the robust mark, and another part of the product,
- a means of transmitting an item of information representing the image of said robust mark, said sensitive mark and said other image part,
- a means of comparing said item of information representing the image of said robust mark, said sensitive mark and said other image part with at least one remote memorized item of information and a means of displaying data relating to the product, an image of which was captured, depending on the result provided by the comparison means.

BRIEF DESCRIPTION OF THE DRAWINGS

As the advantages, aims and characteristics of this marking device, this authentication method and this authentication device are similar to those of the marking method that is the subject of this invention, they are not repeated here.

Other advantages, aims and characteristics of the present invention will become apparent from the description that will follow, made, as an example that is in no way limiting, with reference to the drawings included in an appendix, in which.

DETAILED DESCRIPTION OF THE PREFERRED EMBODIMENTS

Figure 1:
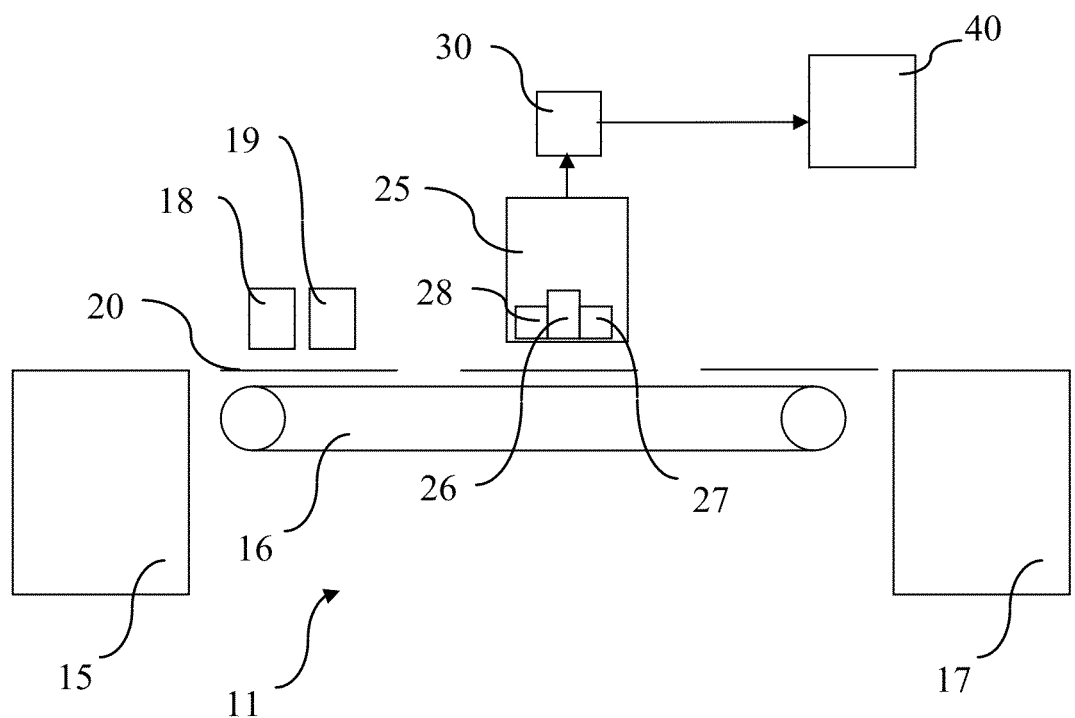
FIG. 1 represents, schematically, in a front view, a first particular embodiment of the devices that are the subject of this invention.

Before giving the details of the various particular embodiments of this invention, the definitions that will be used in the description are given below:

"Information matrix": this is a machine-readable physical representation of a message, generally affixed on a solid surface (unlike watermarks or digital watermarks, which modify the values of the pixels of a design to be printed). The information matrix definition encompasses, for example, 2D bar codes, one-dimensional bar codes and other less intrusive means of representing information, such as "Dataglyphs" (data marking);

"Marking" or "printing": any process by which one goes from a digital image (including preferably an information matrix) to its representation in the real world, this representation generally being made on a surface: this includes, in a non-exclusive way, ink-jet, laser, offset and thermal printing, and also embossing, laser engraving and hologram generation. More complex processes are also included, such as molding, in which the digital image is first engraved in the mold, then molded in each product. It is noted that a "molded" image can be considered to have three dimensions in the physical world even if its digital representation comprises two dimensions. It is also noted that several of the processes mentioned include several transformations, for example conventional offset printing (unlike "computer-to-plate" offset) includes the creation of a film, said film serving to create a plate, said plate being used in printing. Other processes also allow an item of information to be printed in the non-visible domain, either by using frequencies outside the visible spectrum, or by inscribing the information inside the surface, etc;

"Imprint" or "information representing an image": all the characteristic values measured, allowing a mark to be represented and compared to other representations of marks;

"Capture": any process by which a digital representation of the real world is obtained, including the digital representation of the external surface of a product or its thickness (by back-lighting);

"Cell": this is a regular area, generally rectangular or even square, of a variable characteristic dot pattern ("VCDP") in which there is, at most, a predefined number of dots, the predefined number generally being equal to one;

"Generation pixel": the smallest area considered for generating a VCDP;

"Dot": a printed elementary area of very small size, possibly variable, making a contrast with a background, the dot generally being the representation of one or more generation pixels;

"Capture pixel" or "image pixel": an area, the image of which corresponds to a photosensitive elementary dot, or pixel, of an image sensor;

The digital authentication codes, also called "DAC" or marks sensitive to copying below, are digital images that, once marked on a medium, for example by printing or local modification of the medium, are designed so that some of their characteristics, generally automatically measurable from a captured image, are modified if a marked image is copied. The digital authentication codes are generally based on the degradation of one or more signals sensitive to copying during the copy step, a signal being borne by image elements with measurable characteristics sensitive to copying. Certain types of digital authentication codes can also contain an item of information allowing the document containing it to be identified or tracked.

There are several types of digital authentication codes. The copy detection patterns, also called "CDP" below, are dense images, generally of a pseudo-random nature. Their reading principle is based on an image comparison in order to measure an index of similarity (or dissimilarity) between the original copy detection pattern and the copy detection pattern captured, for example by an image sensor: if this captured image is a copy it will have a lower index of similarity than if it is an original.

Like the two-dimensional bar codes, the secured information matrices, also called "SIM" below, are images designed to carry a large quantity of information in a robust way. However, unlike two-dimensional bar codes, secured information matrices are sensitive to copying. On reading, an error rate is measured for the coded message extracted from the matrix, a rate that is higher for the copies than the originals, which allows these copies to be distinguished from original prints.

FIG. 1 shows an embodiment of the marking device 11 that is the subject of this invention adapted to a machine processing products to be marked 20 that may have been printed at other sites or on other dates. In other embodiments, this device 11 that is the subject of this invention is adapted to a print chain and processes the products from the initial printing of their external surface or in their thickness.

For example, the product to be marked 20 is a label or packaging for an industrial product.

The product identification device 11 comprises:
an unstacker 15, known per se, which unstacks the products 20,
a conveyor 16, of known type,
a stacker 17, which makes a stack of the products 20 processed by the device 11,
a means 18 of forming, on or in said product, a mark robust to copying, with a first resolution,
a means 19 of forming, on or in said product, a mark sensitive to copying, with a second resolution higher than the first resolution,
a means 25 of capturing an image of the robust mark, the mark sensitive to copying and another part of the product (see FIG. 10), on each product 20,
a means 30 of generating an individual imprint, variable from one product to the next and according to the image provided by the capture means 25 and
a means 40 of remote storage for storing said imprint corresponding, individually, to the product 20, for example a database.

In the case wherein this invention is adapted for a print chain, the unstacker 15 is upstream of the print chain and it is only after printing that the products 20 bear, firstly, a robust mark and, secondly, a mark sensitive to copying, or anticopying mark.

In embodiments, the anti-copying mark is a DAC as described above.

The image capture means 25 comprise a camera 26 and at least one source of light 27, possibly by back-lighting if the anti-copying mark is formed in the thickness of the product 20 or if the product 20 is sufficiently transparent for at least one light wavelength. The image capture means 25 also comprise a means of detecting 28 the arrival of a product 20, for example an opto-electronic cell placed on the path followed by the products 20, upstream from the reading means 25.

The imprint generation means 30 processes the image captured by the camera 26, which determines characteristics of the image of the robust mark, the mark sensitive to copying and a part of the product 20. Thus, in order to match the product and the imprint that is generated individually for each product 20, a vision system dynamically reads an image of the part of the product that bears the robust mark and the mark sensitive to copying, and then transmits the information to the means of generating 30 the imprint.

In embodiments, the imprint is formed of a part of the captured image, preferably normalized in proportion to the dimensions of the robust and sensitive marks. In other embodiments, such as those described below, a part of the captured image surrounding the robust and sensitive marks is processed.

Figure 10:
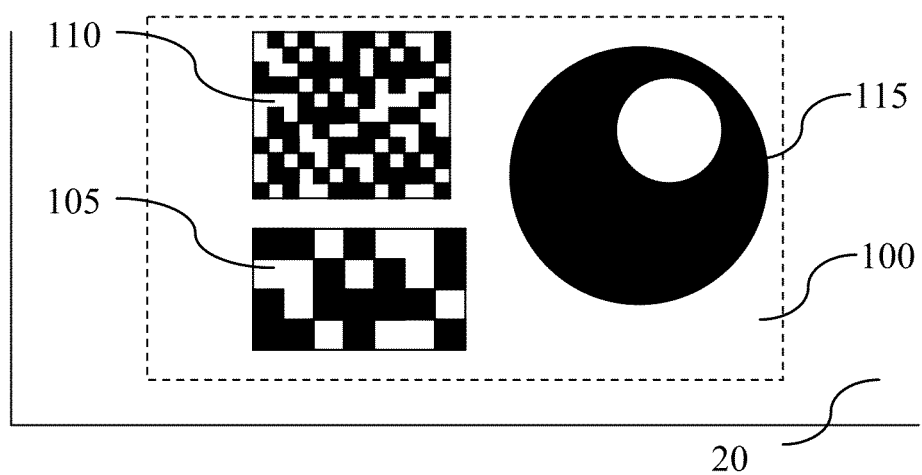
FIG. 9 illustrates a graph obtained during the determination of an optimum error rate to be obtained on printing and FIG. 10 represents a part of a product utilized in particular embodiments of the methods and devices that are the subjects of this invention illustrated in FIGS. 1 and 2.

For example, as shown in FIG. 10, the image part 100 processed corresponds to three times the height of the robust mark 105 by three times the width of the robust mark 105 and is centered on the bottom right corner of the sensitive mark 110. This image part comprises another part 115 of the product, e.g. a logo or writing whose position is, preferably, variable in relation to the robust and sensitive marks, from one product 20 to another.

An example of the method for generating the imprint is given below.
from sub-set "ICNA" of the information of the image, an associated value "VA" is calculated by an associated value calculation function "F", or a function "F'" that optionally uses one or more other parameters designated as "K",
a timestamp "T" is obtained,
an identifier "ID" of the machine generating imprints is obtained,
an encryption key "KCV" of the imprint is obtained,
"VA", "T" and "ID" are concatenated, preferably in a binary representation, with a "CONC" function in order to obtain the concatenation "C" and
the concatenation "C" is encoded with an "ENCRYPT" encryption function and the encryption key KCV, in order to obtain "CENC".

With regard to the "F" function, this is, in a non-limiting way, a function that calculates a value "VA" from sub-set "ICNA".

With regard to the "F'" function, in the case where the "F'" function is used with parameter(s) "K", "F'" can, for example, be an encryption function (for example, known by the name "Triple-DES" or "AES"). "F" can also be a hash function in combination with a key, here the parameter "K", which must be kept secret.

With regard to the "CONC" function, the values "VA", "T" and "ID" can be integers or have a value belonging to a defined set (for example, there are four machines generating imprints, thus there are four possible values for "ID"). In the second case, the number of bits required to represent the set of possible values is defined. In the first, the integers are generally represented over a defined set of bits.

With regard to the "ENCRYPT" function, it can be a symmetric encryption function, for example known by the name "Triple DES", "AES" or "RC4", or an asymmetric encryption function, for example known by the name "RSA".

In the embodiments of this invention described below with regard to FIGS. 3 to 8, the following are utilized:
steps 301 to 303, digitally designing robust and fragile marks,
steps 311 to 314, calculating the imprint,
steps 320 to 326, optimizing the printing of marks and
steps 331 to 334, storing in remote storage imprints or unique characteristics of products.

With respect to digitally designing a sensitive mark and determining a sensitive mark's print parameters, at the origin of certain particular characteristics of this invention, it has been discovered that, if a single source image of a secured information matrix is printed several times, this will be affected by different errors on each print. The same effect has also been noted for copy detection patterns. More generally, it has been noted that, for any image having a sufficient density:
printing the image will result in a degradation of the image, and
the printing will be affected by a different degradation on each print.

To be more precise, this phenomenon is not limited to DAC digital authentication codes. In effect, whatever the density of a digital image, each of its prints will differ from all the other prints, given the random processes utilized in printing. However, for low-density images, the differences will be much less numerous and significant. Therefore a much higher capture resolution is needed in order to capture the differences, which are sometimes minimal. In contrast, for digital authentication codes printed with adequate resolution, it is not necessary to use a particularly high capture resolution (a 1,200 dots per inch scanner is shown to be sufficient). In addition, as the differences are very significant, the extraction of the unique characteristics does not have to be done with very great precision, which is advantageous in terms of the cost and stability of the reading algorithms.

The marks sensitive to copying, or identifier patterns, are images designed and printed so as to maximize the differences between each print of a single source identifier pattern. Preferably these images are designed in a pseudo-random way (for example with one or more cryptographic keys), but they can be completely random (the difference being that, in the second case, there is no cryptographic key or the key is not kept). However, it is noted that the original digital identifier pattern can be known without compromising security. In effect, only the identifier pattern recorded (with their imprint) in the database is legitimate, and in theory it is not possible to control the unanticipated unknowns in printing. Therefore, possession of the original image does not give the counterfeiter any real benefit, which is another advantage, in terms of security, of identifier patterns.

Since the degradations are random in nature and produce a different result for each print of a single source image, each print of an identifier pattern has unique characteristics that cannot be reproduced or transferred. Thus, each of the prints of a single identifier pattern is different from all the others, and therefore per se has the means for identifying it unequivocally. An identifier pattern's imprint can therefore be calculated and used in different ways in order to increase the security of the product that contains it, especially in identification and check modes.

The identifier patterns can be simple rectangles, possibly enclosed by a border making their detection easier, but can also have a special shape, such as a logo, etc. However, the rectangular shape is shown to have advantages with regard to reading (it can be easily identified) and its compatibility with the normal shapes of digital authentication codes or other codes such as one- or two-dimensional bar codes.

An algorithm for designing an identifier pattern is described below:

during a step 301, a cryptographic key is received, for example a 32-byte (256 bits) sequence, during a step 302, by using a recursive encryption or hashing function, the algorithm being initialized with the cryptographic key, the required number of random bits is generated. The reader may draw on the FIPS (acronym for "Federal Information Processing Standard") and AES (acronym for "Advanced Encryption Standard") standards and during a step 303, the bits are assembled into an image, for example of 100×100 dots, possibly completed by a border.

Figure 3:
FIG. 3 represents, in an enlarged view, a digital identifier pattern utilized in particular embodiments of the method that is the subject of this invention.
Figure 4:
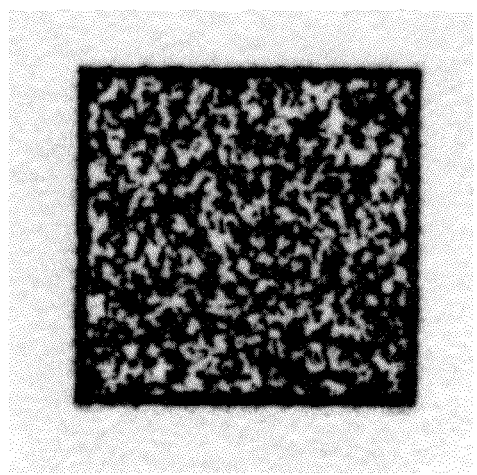
FIG. 4 represents, in an enlarged view, the digital identifier pattern of FIG. 3, once printed on an card, in a first print of a series.
Figure 5:
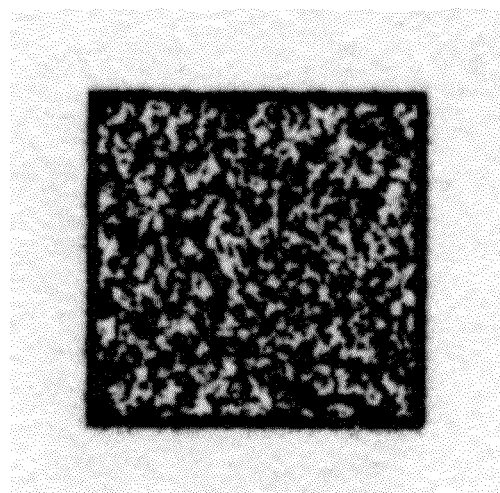
FIG. 5 represents, in an enlarged view, the digital identifier pattern of FIG. 3, once printed on an card, in a second print of a series.
Figure 6:
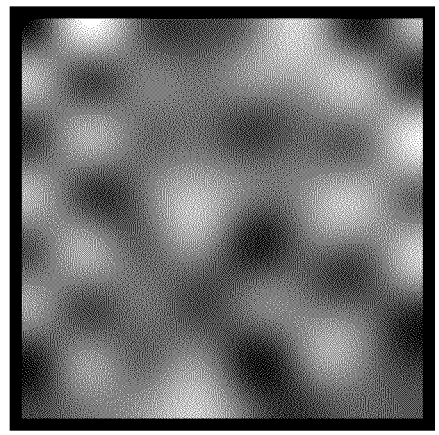
FIG. 6 represents a discrete cosine transform of an image captured from one of the printed identifier patterns represented in FIGS. 4 and 5, FIGS. 7A and 7B represent, in the form of logical diagrams, steps utilized in particular embodiments of the method that is the subject of this invention.
Figure 7A:
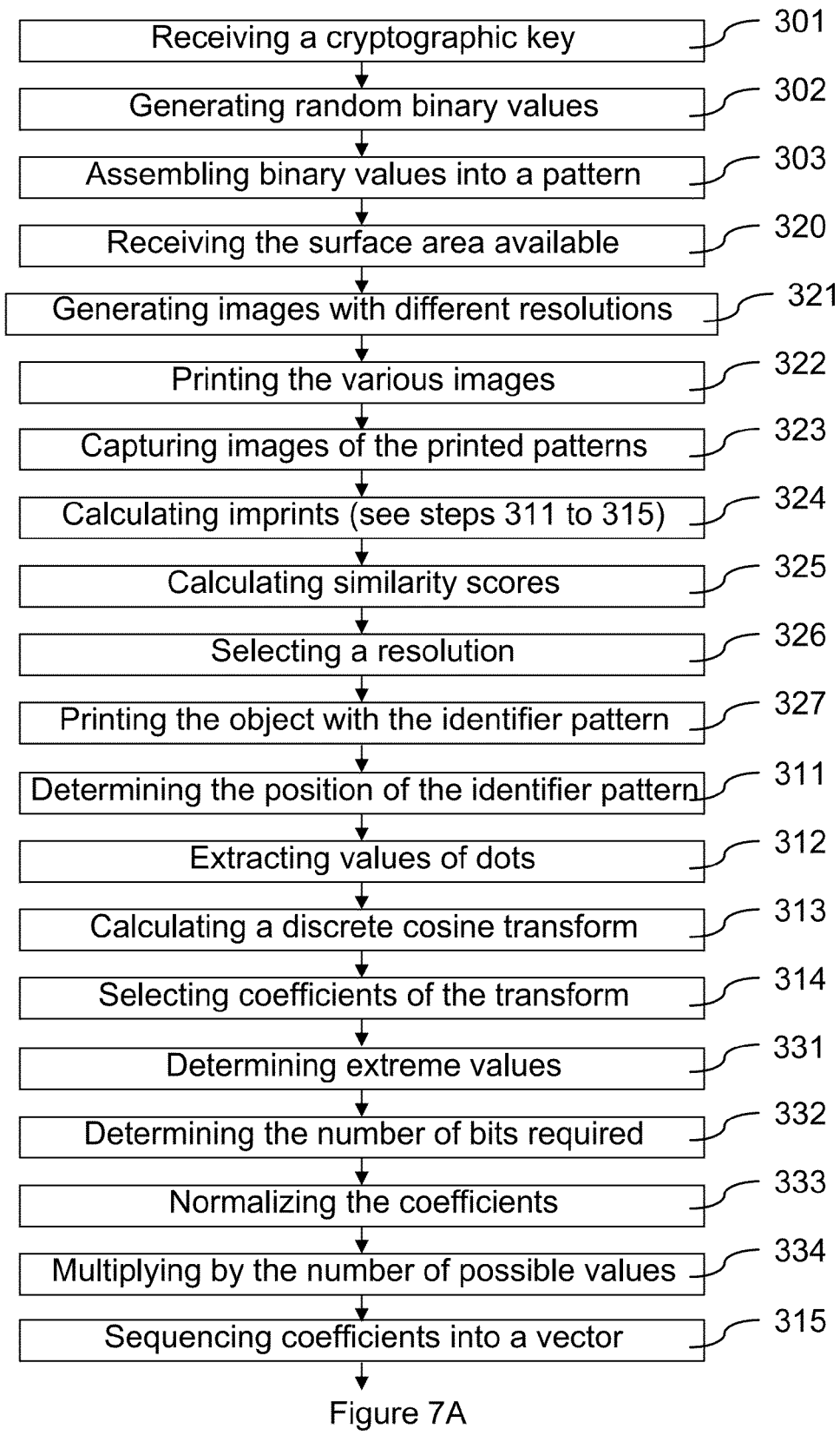
Figure 7B:
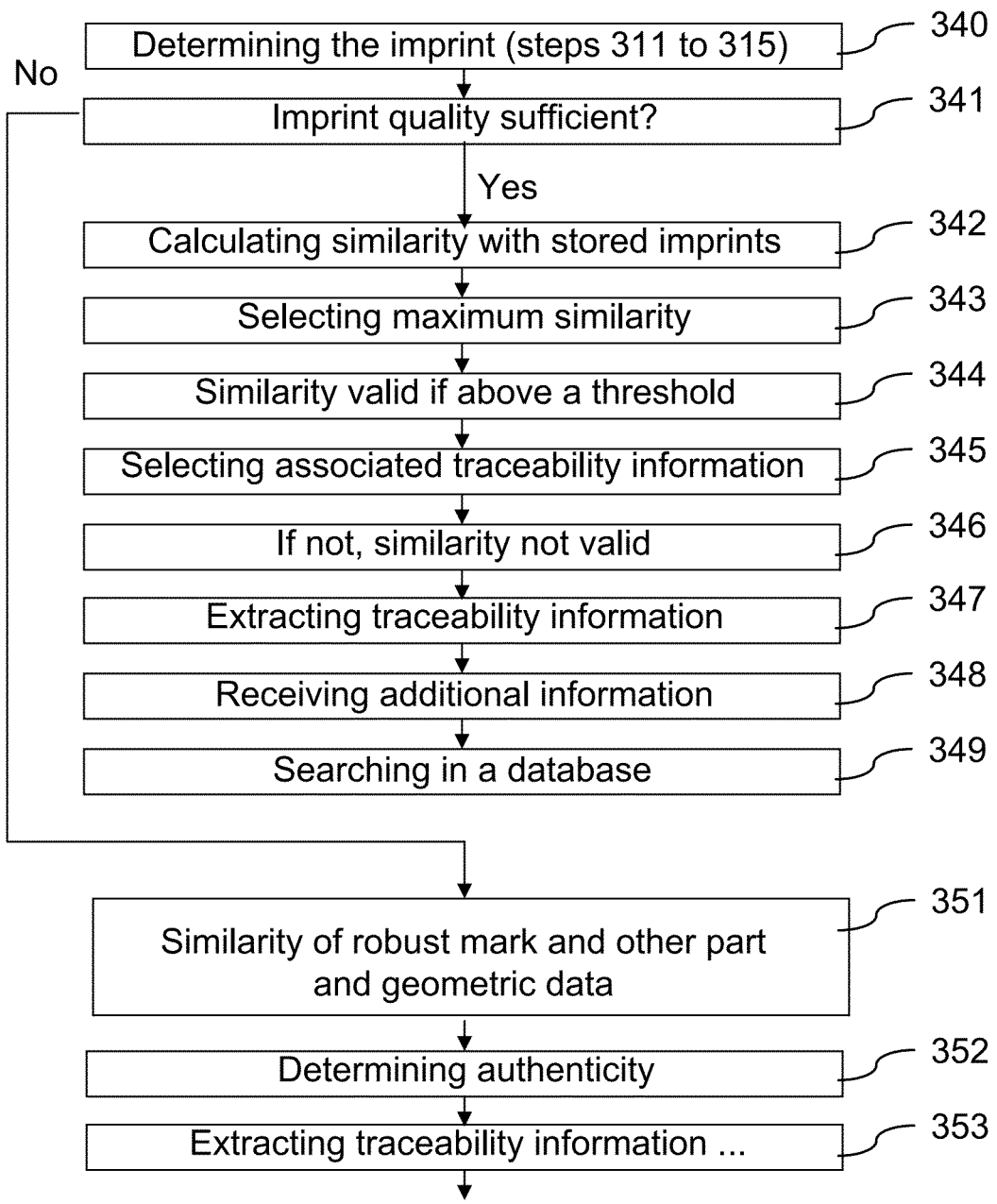

FIG. 3 shows such an identifier pattern, before printing. FIGS. 4 and 5 show two different prints of the identifier pattern shown in FIG. 3.

The digital authentication codes (or "anti-copying" codes) are images designed and printed so as to maximize the differences between the original print and a copy obtained by using a capture of an image of the original print and a second print of this image utilizing the same print parameters, especially in terms of resolution, as the first print.

The functions of a digital authentication code can be combined with those of an identifier pattern, since the design and print characteristics of digital authentication codes are close to those required for the identifier patterns. For example, the design algorithms of the copy detection patterns, which require a cryptographic key, are similar to the algorithm described previously, even though the desired result is very different. As for the design algorithms of the secured information matrices, they require both one or more cryptographic keys and one or more messages. The result, however, is similar, i.e. an image with pseudo-random values.

As will be seen below, it turns out that the ideal print conditions for identifier patterns are close to the ideal print conditions for digital authentication codes. Thus it is possible, with respect to both the design and the printed result, to combine the functions of the digital authentication codes and those of the identifier patterns.

With regard to the methods of extracting and, when checking a product, of comparing the imprint of an identifier pattern, first of all a generic extraction and comparison method is described below, which consists of extracting the values of a set of dots of a captured identifier pattern:

during a step 311, the positions of the robust mark 105 and the sensitive mark 110 in the image of the marked product are determined. For rectangular-shaped marks, for example, the positions (height, width) of the four edges of the each mark can be extracted, and then the area of interest 100 in the captured image is determined.

during a step 312, for a given number of dots to be extracted, the position in the image is determined and the value of each of these dots is extracted. The position of the dots can be determined by using standard geometric techniques, known from the prior art. The values obtained for each dot of the image sensor are, for example, on a scale of 0 to 255, as well as the captured image. As the positions can be fractional, the value of the dot taken can be that "of the nearest neighbor", a method that is not very costly but not very precise, or an interpolated value. The result is a 256×256 matrix of integer (nearest neighbor) or floating-point (interpolation) values.

during a step 313, the discrete cosine transforms in two dimensions are calculated for the dot matrix corresponding to the robust mark 105, the dot matrix corresponding to the sensitive mark 110 and the dot matrix corresponding to the predefined image part 115.

The discrete cosine transform is advantageous since it makes it possible to significantly compress the signal energy over a small number of components. During this same step 313, the ratios of the distances from the centers of elements 105, 110 and 115 or the angles of the triangle that they form are determined.

during a step 314, a given number of coefficients of each transform are selected, for example the 10×10 lowest frequency coefficients, and possibly eliminate the constant coefficient, known under the name "DC" coefficient at position (0, 0) then the coefficients are re-sequenced into a vector, which constitutes the imprint of the secured information matrix.

It is noted that the method described above does not utilize any secret and, consequently, allows anyone whosoever to calculate the imprint. This can be desirable in certain cases, where it is not considered to pose a security risk. In contrast, in other cases it is desirable for only authorized people to be able to calculate the imprint. To do this, a cryptographic key is used that is kept secret and which makes it possible to determine the coefficients constituting the imprint. This key is only divulged to people or entities authorized to reconstitute the imprint. Techniques from the prior state of the art are available to the person skilled in the art for selecting the coefficients from the key, generally utilizing a hashing algorithm or an encryption algorithm.

Two imprints corresponding to separate captures can then be compared in multiple ways so as to obtain a measurement of similarity or, conversely, a measurement of distance. By measuring, for example, a coefficient of correlation between them, a measurement of similarity is obtained, which will be referred to as the "score" subsequently.

It is noted that, even if the sensitive mark 110 cannot be used, the other elements of the imprint, 105 and 115 as well as the geometric relationships (ratios of distances or angles), make it possible to estimate the authenticity of the product 20 for which one image has been captured, by comparison with the corresponding parts of remote memorized imprints.

To validate this method of extracting unique characteristics, an identifier pattern of 100×100 pixels was generated that was printed 100 times on a 600 dots per inch laser printer. A 1200 dots per inch "flatbed" scanner was used to carry out three captures of each printed identifier pattern. An imprint was then calculated for each of the 300 captures done. A score is then measured for each of the 44,850 pairs of imprints (number calculated as follows: 300*(300−1)/2). These 44,850 imprint pairs are separated into two groups:

one group A of 600 pairs of imprints corresponding to different captures of the same printed identifier pattern and one group B of 44,250 pairs of imprints corresponding to captures of different printed identifier patterns.

Figure 8:
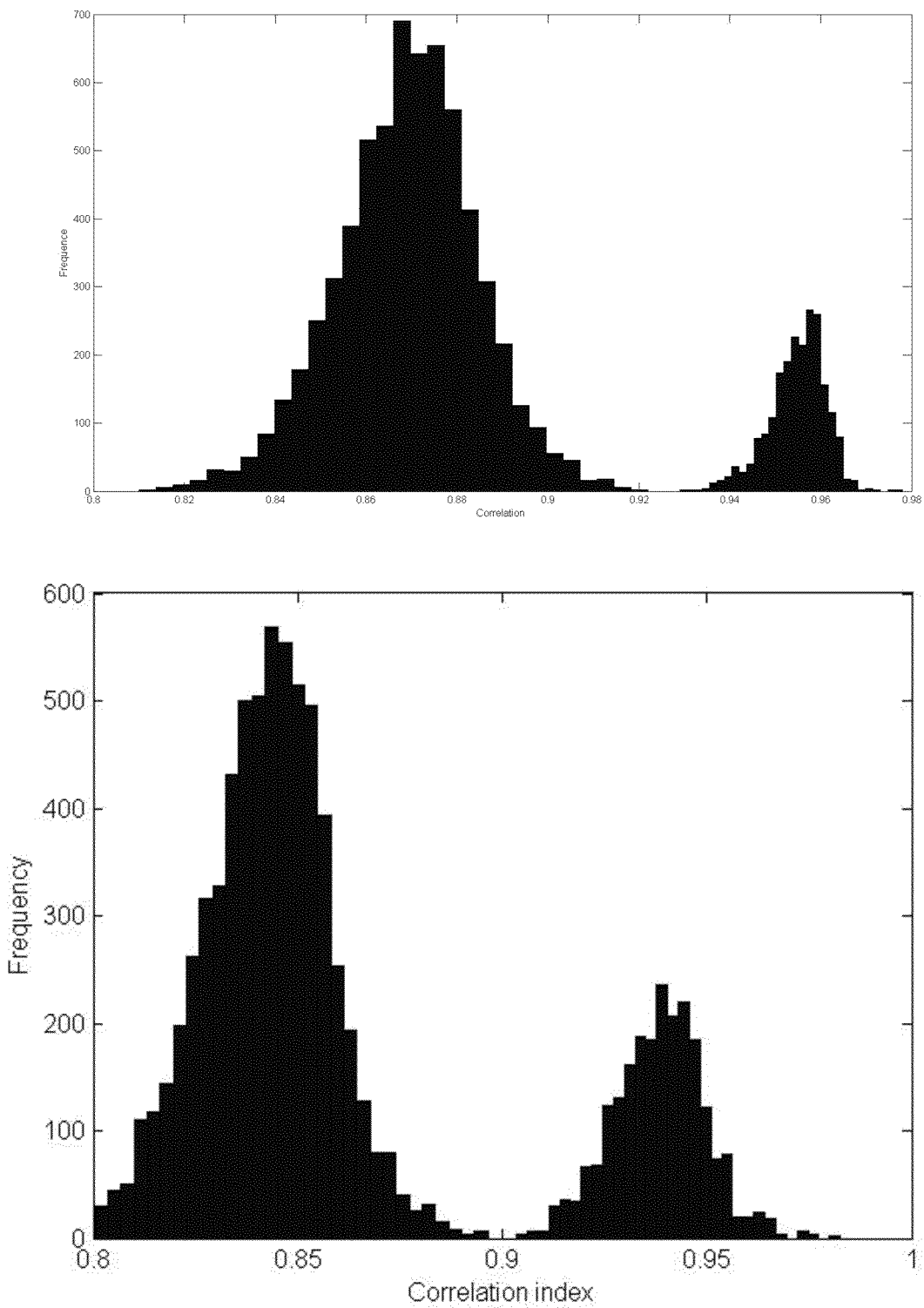
FIG. 8 represents a distribution of the scores for two groups of identifier patterns utilized in particular embodiments of the method that is the subject of this invention.

The score is between 0.975 and 0.998 for group A, and between 0.693 and 0.945 for group B. FIG. 8 shows the distribution of the scores for group A and group B. On the basis of these scores, no confusion between the pairs of the two groups is possible. Thus, by using the imprint calculation method described above, which of the 100 prints is the source of the captured image can be determined without ambiguity.

An "imprint separation degree" is measured, which consists of calculating the difference of the averages of the scores for groups A and B (here 0.992 and 0.863 respectively) and normalizing it by the standard deviation of the scores of group A, here 0.005. A value of 25.8 is obtained. As will be seen later, this index is useful for determining the print and design parameters giving the best results.

A second method of extracting imprints concerning the secured information matrices is described below. This method applies in particular when the identifier pattern also has the functions of a secured information matrix. It explains how a captured secured information matrix's scrambled message is extracted. This scrambled message has a non-zero error rate and the structure of the errors is used as an imprint.

An advantage of this method is that it makes it possible to use software designed to read secured information matrices. This minimizes the cost of the calculations required.

However, the precise reading of a secured information matrix requires a key serving to generate the blocks to align, if necessary. Divulging this key is not necessarily wanted in all cases. In addition, the internal alignment variations specific to each print are eliminated as far as possible. This is not necessarily desirable, since these variations play a part in differentiating the different prints of a secured information matrix.

With respect to the method of determining optimal parameters for generating and printing identifier patterns, an optimal level of degradation exists that enables the various prints of a single source identifier pattern to be separated as easily as possible. Thus, if the level of degradation on printing is very low, for example 1% or 2% (1 or 2% of the identifier pattern's cells or pixels are misread from a perfect capture), the various prints of a single identifier pattern are very close to each other and it is difficult to identify them reliably, unless there is a very precise capture and/or a very precise analysis algorithm. Similarly, when the level of degradation is very high, for example 45% or 50% (45 or 50% of the identifier pattern's cells or pixels are misread from a perfect capture, 50% signifying that there is no statistical correlation between the matrix read and the source matrix), the printed identifier patterns are almost indistinct from each other. In reality, the optimal level of degradation is close to 25%, and if the application conditions allow it, it is preferable to be close to this level. In effect, for 25% degradation, assuming that the print variations and therefore the degradations are by nature probabilistic, for each of the dots of the printed identifier pattern, the probability that it differs from the other printed identifier patterns is maximized.

A second analysis is given below of the error rates to be looked for when generating an image to be printed according to the printing means utilized.

In order to determine how VCDPs can be generated that enable the detection of copies to be optimized, a model based on decision theory is presented below. The characteristics measured on the images (or dots) are represented by signals. In order to simplify the analysis, the hypothesis is made that the digital signals, before printing, have binary values, corresponding to characteristics that can have binary values (for example, two sizes of dots, two positions, etc). This hypothesis is justified by the fact that most print processes process binary images. Clearly, the conclusions of the analysis can be extended to more complex cases, especially with several possible values for dot characteristics. The printing of the VCDP is modeled by adding Gaussian noise. It is also assumed that the copies are made with the same print process, such that the printing of the copy is also modeled by adding Gaussian noise of the same energy. In addition, the counterfeiter, who captures the signal before printing a copy of it, is forced to reconstruct a binary signal by making an estimate of the initial value that minimizes its probability of error.

This model directly corresponds to VCDPs that can have dot sizes of 1×1 pixel or 1×2 pixels (printed, for example, at 2400 dpi), for which the counterfeiter must necessarily choose one of the dot sizes in the image reconstituted from a scan, according to a measured grey scale or an estimated surface area of the dot. The model also corresponds to VCDPs with positions varying by 1 pixel, for example.

From this model, the optimal detector, the statistical distribution of the detector's values and the parameter values that maximize copy detection are derived.

The following table summarizes the different variables.

| s | Source signal |
|---|---|
| $n, n_c$ | Noise, copy noise |
| x | Signal received |

Without losing generality, the source signal is equiprobable, i.e. $s[i]: \{+\alpha, -\alpha\}$, for $i=0, 1, \ldots, N-1$, and $\alpha>0$. The print noise follows a Gaussian distribution $N(0, \sigma^2)$.

The hypotheses of the model are summarized thus:

$$(H0) x[i]: \{+\alpha, -\alpha\} \quad (1)$$

$$(H1) n[i]: N(0, \sigma^2) \quad (2)$$

$$(H2) n_c[i]: N(0, \sigma^2) \quad (3)$$

Whether counterfeiters minimize their probability of error can be easily checked by restoring the signal to the closest value between $+\alpha, -\alpha$.

Consequently, the detection problem consists of distinguishing the following two hypotheses:

$$H_0: x[i] = s[i] + n[i] \quad (4)$$

$$H_1: x[i] = \alpha \cdot \text{sign}(s[i] + n[i]) + n_c[i] \quad (5)$$

where $H_0$ and $H_1$ are the hypotheses that the received signal is, respectively, an original and a copy.

The probability that the counterfeiter has correctly estimated the value is:

$$p(\text{sign}(s[i] + n[i]) = s[i]) = p(s[i] + n[i] > 0) \quad (6)$$

$$= p(N(a, \sigma^2) > 0) \quad (7)$$

$$= p(N(0, 1) > -a/\sigma) \quad (8)$$

$$= Q(-a/\sigma) \quad (9)$$

where $Q(x) = (2\pi)^{-1/2} \int_{-a/\sigma}^{+\infty} \exp^{-x^2/2} dx$.

The probability distributions for the signal received are as follows, where there is a mixture of two Gaussian distributions in the hypothesis $H_1$.

$$p(x; H_0) = \frac{1}{(2\pi\sigma^2)^{\frac{N}{2}}} \exp\left[-\frac{1}{2\sigma^2} \sum_{n=0}^{N-1} (x[n] - s[n])^2\right] \quad (10)$$

$$p(x; H_1) = (1 - Q(-a/\sigma)) \frac{1}{(2\pi\sigma^2)^{\frac{N}{2}}} \exp\left[-\frac{1}{2\sigma^2} \sum_{n=0}^{N-1} (x[n] - s[n])^2\right] + \quad (11)$$

$$Q(-a/\sigma) \frac{1}{(2\pi\sigma^2)^{\frac{N}{2}}} \exp\left[-\frac{1}{2\sigma^2} \sum_{n=0}^{N-1} (x[n] - s[n])^2\right] \quad (12)$$

Whether a simple correlator gives an optimum classification function is going to be checked. A Neyman-Pearson detector test decides $H_1$ whether the likelihood ratio exceeds a threshold t:

$$L(x) = \frac{p(x; H_1)}{p(x; H_0)} > t \quad (13)$$

The likelihood ratio is given by:

$$L(x) = Q(-a/\sigma) + (1 - Q(-a/\sigma)) \quad (14)$$

$$\exp\left[-\frac{1}{2\sigma^2} \left(\sum_{n=0}^{N-1} (x[n] + s[n])^2 + \frac{1}{2\sigma^2} \sum_{n=0}^{N-1} (x[n] - s[n])^2\right)\right]$$

Taking the logarithm, and a new threshold t', one obtains:

$$T'(x, s) = \sum_{n=0}^{N-1} x[n]s[n] < t' \quad (15)$$

The classification function is therefore a simple correlator T', the value of which must be less than a threshold t' to classify the signal as a copy.

The statistics of T' for both hypotheses are determined. It can be assumed that T' follows a Gaussian distribution (true for N high), the means and variances of which are derived for both hypotheses:

$$E[T'; H_0] = N\alpha^2 \quad (16)$$

$$E[T'; H_1] = Q(-\alpha/\sigma)N\alpha^2 - (1 - Q(-\alpha/\sigma))N\alpha^2 = (2Q(-\alpha/\sigma) - 1)N\alpha^2 \quad (17)$$

$$\text{Var}[T'; H_0] = N\alpha^2\sigma^2 \quad (18)$$

$$\text{Var}[T'; H_1] = N(\alpha^2\sigma^2 + \alpha^4 Q(-\alpha/\sigma)(1 - Q(-\alpha/\sigma))) \quad (19)$$

The second term of the variance for the hypothesis $H_1$, $(\alpha^4 Q(-\alpha/\sigma)(1-Q(-\alpha/\sigma)))$, can be eliminated if the copies come from the same original. In practice, as counterfeiters minimize their work by only using one original to produce a large number of copies, it is reasonable to eliminate the term.

In the case in which the variances are equal, the detection performance can be characterized by the deflection coefficient $d^2$, which corresponds to the difference between the means of function T' for the two hypotheses, normalized by the variance of T':

$$d^2 = \frac{(E[T'; H_0] - E[T'; H_1])^2}{\text{Var}[T'; H_0]} \quad (22)$$

$$= \frac{2N^2 a^4 (1 - Q(-a/\sigma))^2}{N a^2 \sigma^2} \quad (23)$$

$$= \frac{2N a^2 (1 - Q(-a/\sigma))^2}{\sigma^2} \quad (24)$$

$$= 2N(\gamma(1 - Q(\gamma))^2 \quad (25)$$

where $\gamma = \alpha/\sigma$ is the square root of the signal to noise ratio.

Since the detection performance increases with the deflection coefficient, the objective is to determine the value of $\gamma$ maximizing the expression $(\gamma(1-Q(\gamma)))^2$.

Figure 9:
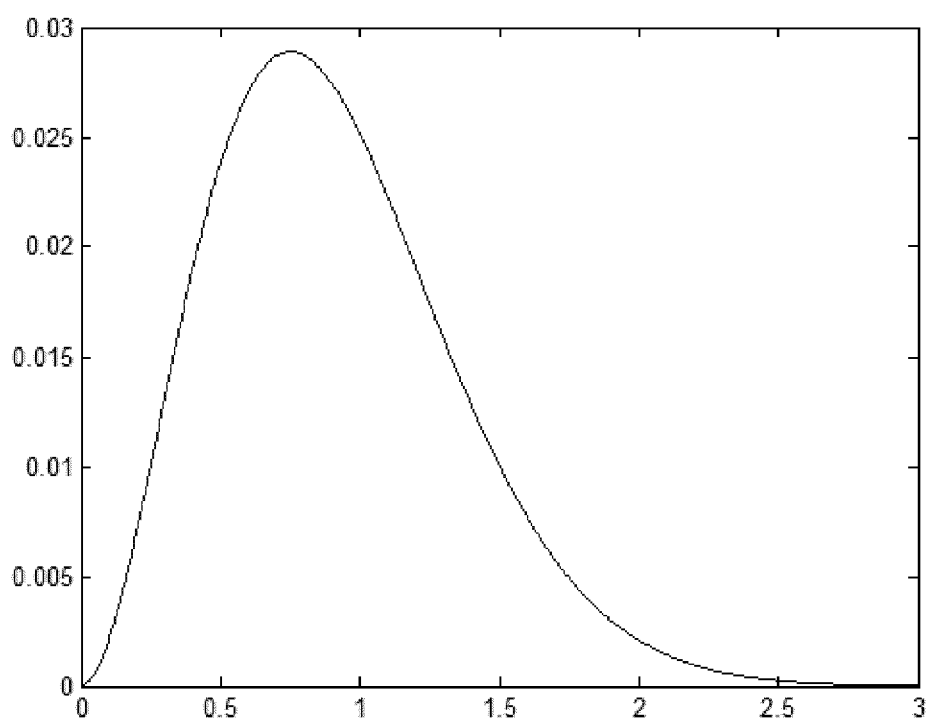

FIG. 9 represents the value of the expression according to $\gamma$. It can be interpreted as follows. The values of $\gamma$ close to zero correspond to a very high noise with reference to the signal: when the noise is very high, the signal is too degraded on the first print, the counterfeiter introduces a number of estimation errors that is too low. Conversely, for values of $\gamma$ that are too high, the signal is not sufficiently degraded, and in too large a proportion of cases the counterfeiter does not introduce any estimation error. Between these two extremes, the expression passes through an optimum value, for which the value is numerically estimated to be $\gamma \approx 0.752$.

It is interesting to note that, for this value, the probability that the counterfeiter has not correctly determined the value is approximately 22.6%.

In practice, it involves obtaining a signal to noise ratio $\gamma^2$ as close as possible to $0.752^2$, i.e. 0.565.

Let us take an example in order to better understand how to target this ratio value. Assume that a VCDP is generated with two possible dot sizes (expressed in number of pixels), the dot size being nine pixels (for example, 3×3 pixels). It is noted that the dot size can be measured by utilizing a large number of algorithms, for example by local adaptive thresholding for the grey scale and counting the pixels below the threshold. Dots of nine pixels are printed a sufficient number of times. In a captured image, the mean and standard deviation for each dot's number of pixels are measured. Assume that a mean of twelve is obtained (an average gain of 33% is observed), and a standard deviation of four. This standard deviation corresponds to the value $\sigma$ describing the noise in the formulae for our model. A value of approximately three will therefore be aimed at for our signal $\alpha$ in order to obtain a ratio $\gamma=0.75$, which is very close to the optimum. In order to obtain this signal value two dot sizes of fifteen and six pixels can be defined, for example.

A possible algorithm for optimizing print parameters is described below:

during a step 320, the surface area available for the identifier pattern is received, for example a square measuring ⅙ inch, during a step 321, several digital images of identifier patterns are generated with different digital sizes, corresponding to various possible print resolutions, for example one identifier pattern of 66×66 pixels at 400 dots per inch, one of 100×100 pixels at 600 dots per inch, one of 133×133 pixels at 800 dots per inch, one of 200×200 pixels at 1200 dots per inch, during a step 322, each one of the identifier patterns with different digital sizes is printed several times, for example 100 times, with suitable resolution so that the dimensions of the print correspond to the surface area available.

during a step 323, for each type, each one of the printed identifier patterns is captured several times, for example 3 times, during a step 324, each identifier pattern's imprint is calculated, during a step 325, the similarity scores are calculated for all the pairs of captured identifier patterns with the same print resolution and during a step 326, the method described in the test of the generic imprint extraction method mentioned above is followed to measure the "imprint separation degree", for each of the print resolutions, and the print resolution giving the maximum value for this degree is selected.

In a variant, several secured information matrices are printed with different print resolutions, and the print resolution resulting in a 25% error rate, as calculated with one of the algorithms described elsewhere, is determined.

In a variant, the print resolution is selected for which there is the greatest difference between the lowest value for the score, calculated on comparing imprints corresponding to identical prints, and the highest value for the score calculated on comparing imprints corresponding to different prints.

With respect to the method of representing and storing characteristics, it is advantageous to reduce the imprint data volume as far as possible. In the case of identification, this involves comparing an imprint to a very large number of imprints stored in a database, which is very costly. This cost is reduced by reducing the size of the imprints to be compared, especially by avoiding using floating-point numbers.

Consider the case of the generic imprint extraction method. The initial data vector extracted from a captured identifier pattern is the 256×256 matrix of extracted values, and its representation by a discrete cosine transform, after selecting coefficients, has 10×10 values. It is advantageous to represent the matrix of values with one byte per value, i.e. 100 bytes.

During a step 327, at least one product is printed with an identifier pattern to produce a secured product.

On the other hand, the coefficients of the discrete cosine transform can be either positive or negative, and in theory are not limited. In order to represent such values with a fixed amount of information, the values must be quantified so as to be represented in binary values. A possible approach is as follows:

during a step 331, a minimum value and a maximum value are determined, in advance, for each coefficient. In general, the minimum and maximum values have the same absolute value.

during a step 332, the number of bits or bytes allowing each value to be represented is determined and during a normalization step 333, for each coefficient of the discrete cosine transform, the minimum value is subtracted and then the remainder is divided by the maximum value, during a step 334, the result is multiplied by the number of possible values of the quantified data, i.e. 256 if one byte is available for each value. The integer value of the result is compared to the original quantified value.

In a variant, the quantification steps are optimized so as to minimize the quantification error.

To check the authenticity of a product, a consumer takes an image comprising at least the robust mark, the mark sensitive to copying and another part of the product.

In embodiments, the following steps are utilized:

during a step 340, the imprint of the sensitive mark, or identifier pattern, contained in the captured image is determined, during a step 341, it is determined whether this imprint is of a sufficient quality, for example by determining how many of the imprint's values are greater than a predefined value (in effect, an image that is blurred or without sufficient resolution will have very low values for its high frequency coefficients), if yes, during a step 342, one calculates the score, or similarity, of the imprint obtained in step 340 with each of the imprints stored in the remote database 40, during a step 343, the maximum similarity obtained is determined, by comparing the calculated imprint with all the imprints corresponding to the same type of product stored remotely, for example in a database, during a step 344, if the maximum similarity is above a threshold value, the identifier pattern is deemed valid, i.e. the product 20 is authentic, and, during a step 345, the associated traceability information is retrieved, if not, during a step 346, the identifier pattern is deemed not valid.

In variants:

during a step 347, if the identifier pattern also has the functions of a digital authentication code, the traceability information is extracted.

during a step 348, the traceability information allowing the search space to be reduced can also come from another source, for example an associated bar code, information from the controller, reading the product's non-volatile memory, etc and during a step 349, this information is used to reduce the search space in the database. For example, the manufacturing order information makes it possible to pre-select imprints to be compared from the sub-set of imprints corresponding to this manufacturing order.

If the result of the test 341 is negative, during a step 351, the similarity is determined of the robust mark 105, the other image part 115 and the geometric data (ratios of distances or angles), as described above, with reference to the database 40. Then, during a step 352, it is determined whether the product 20 is authentic according to the maximum similarity found.

During a step 353, steps 347 to 349 are performed.

With respect to the method of checking without database, this requires the pre-calculated imprint of the identifier pattern to be stored on the product 20. For example, during the step calculating the imprint of each of the legitimate products, these can be destined both to be stored in a database 40 and to be stored in a secured way on the document 20, for example in an additional robust mark formed on the product 20.

With respect to a combined use of an identifier pattern with the functions of a digital authentication code, the prior state of the art methods of uniquely characterizing products use characteristics that cannot be interpreted without making use of a database. In contrast, while the identifier patterns can simply be images with no significance, as has been seen, they can also be images comprising other functions. In particular they can be digital authentication codes, in which case they can comprise secured information (one or more keys are required to read them), and/or have authentication properties (to distinguish an original from a copy).

Figure 2:
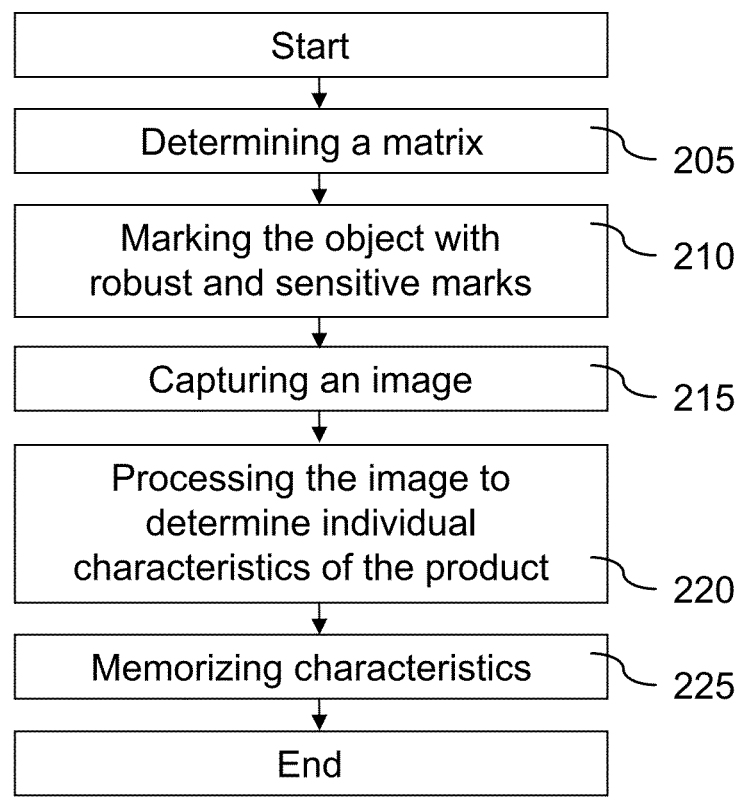
FIG. 2 represents, in the form of a logical diagram, steps utilized in a particular embodiment of the method that is the subject of this invention.

FIG. 2 shows:
- a step 205 of determining a matrix of dots representing an item of information associated to a product to be authenticated,
- a step 210 of affixing a robust mark 105 and a mark 110 sensitive to copying to the product in such a way that the sensitive mark presents unpredictable errors due to the physical characteristics of the means utilized during the marking step,
- a step 215 of capturing an image of the robust mark 105, the sensitive mark 110 and another part 115 of the product 20 (see FIG. 10), possibly with a step of extraction from the part 100 of the image,
- a step 220 of determining physical characteristics of the image or the image part 100 by image processing and
- a step 225 of memorizing, in remote memory, for example on a server accessible over the Internet, an item of information representing the physical characteristics of the unpredictable errors, or imprint.

During the step 205, the robust mark 105 (e.g. a Datamatrix) and the mark sensitive to copying 110 (e.g. a DAC or a VCDP) are determined, for example in the form of a matrix of areas, each comprising hundreds of dots and each representing, for at least a part, an item of binary information. The item of information associated to the product 20 in either of these marks 105 and 110 is, for example, the name of its manufacturer, the product's manufacturing order and/or date of manufacture.

During a step 210, the robust mark 105 is affixed. The sensitive mark 110, formed of a dot matrix, is affixed at the same time, with a resolution such that at least two percent, preferably five percent, of the dots of the mark sensitive to copying 110 are erroneous, preferably in an individually unpredictable way, compared to the original dot matrix. For example, a printer's maximum resolution is used. The effect of this resolution is such that, in particular, copying the product, which entails copying the mark sensitive to copying 110, for example by optical or photographic processes, increases by at least fifty percent the level of errors in the copied mark compared to the original mark.

Preferably, during a step 210, the respective positions of the other image part 115 and at least one of the marks 105 and 110 is random.

During the step 220, the characteristics representing the distribution of errors in the sensitive mark 110 and the part 115 of the product 20 outside marks 105 and 110 are determined, as the physical characteristics or imprint of the product 20. For example, the vector going from the center of the part 115 to the barycenter of the errors borne by the sensitive mark 110 is determined, and a weight is then assigned to the errors depending on their position and a new vector is determined and so on over several iterations. The same succession of steps is performed on the robust mark 105 to obtain an imprint independent of the mark sensitive to copying but dependent on the robust mark 105 of the part 115 of the product 20.

Thanks to the utilization of the present invention, even though the same marking process is utilized, without modification, for example by etching or printing, on many products 20, the physical characteristics of the marks and the element 115 make it possible to give each product 20 at least one unique identification, or imprint. Failing this, the elements 105 and 115, and possibly the geometric data, allow the authenticity of the product 20 to be estimated.

When a consumer wants to check the authenticity of a product 20, he performs a new image capture on this marked product 20. New image processing is applied and the result of this image processing is compared to the information memorized in remote memory to check the authenticity of the product 20.

The error quantity is significant and allows the mark and the product to be uniquely identified. Even in the case where the mark sensitive to copying cannot be used, the authenticity of the product 20 can be checked by utilizing information linked to the robust mark 105 and the part 115 of the image.

Reading the data relating to the product that bears the robust mark 105 provides an origin and/or means of access to a database of physical characteristics of the errors.

Whatever the conditions in which a new image of said mark is captured, the product's characteristics can be retrieved.

The invention claimed is:

1. A method for marking a product, the method comprising:
   forming, on or in said product, a mark robust to copying, with a first resolution;
   forming, on or in said product, a mark sensitive to copying, with a second resolution higher than the first resolution;
   capturing an image of said mark robust to copying, said sensitive mark and another part of the product; and
   memorizing an item of information representing the image of said mark robust to copying, said sensitive mark and said other part of the product.

2. The method according to claim 1, wherein, during at least one forming operation the position of the mark formed during this forming operation is random in relation to the other part of the product.

3. The method according to claim 1, wherein said mark robust to copying is a two-dimensional bar code.

4. The method according to claim 1, wherein said mark sensitive to copying is a digital authentication code, and
   said method further comprising determining an item of information representing print errors for said mark sensitive to copying, during the memorizing, said item of information representing print errors being memorized.

5. The method according to claim 1, wherein, during each of the operations of forming marks, the position of said mark in relation to an element of the product is variable, and
   during the capturing an image, an image of said element is captured.

6. The method according to claim 1, wherein, during the operations of forming marks, the marks formed are offset differently for two different products.

7. A device for marking a product, the device comprising:
   a means of forming, on or in said product, a mark robust to copying, with a first resolution;
   a means of forming, on or in said product, a mark sensitive to copying, with a second resolution higher than the first resolution;
   an image sensor designed to capture an image of said mark robust to copying, said sensitive mark and another part of the product; and
   a means of memorizing an item of information representing the image of said mark robust to copying, said sensitive mark and said other part of the product.

8. The device according to claim 7, wherein at least one of the forming means is designed such that the position of the mark formed is random in relation to the other part of the product.

9. The device according to claim 7, wherein the means of forming said mark robust to copying is designed such that said mark robust to copying is a two-dimensional bar code.

10. The device according to claim 7, wherein the means of forming said sensitive mark is designed such that said mark sensitive to copying is a digital authentication code,
the device further comprising a means of determining an item of information representing print errors for said mark sensitive to copying and the means of memorizing being designed to memorize said item of information representing print errors.

11. The device according to claim 7, wherein each of the means of forming marks is designed such that the position of the mark in relation to an element of the product is variable and the means of capturing an image is designed to capture an image of said element.

12. The device according to claim 7, wherein each means of forming marks is designed to offset the marks formed differently for two different products.

13. A method for authenticating a product, the method comprising:
capturing, on said product, an image of a robust mark and a mark sensitive to copying with a higher resolution than the mark robust to copying, and another part of the product;
transmitting an item of information representing the image of said robust mark, said sensitive mark and said other part of the product;
comparing said item of information representing the image of said mark robust to copying, said sensitive mark and said other part of the product with at least one remote memorized item of information; and
depending on the result of said comparison step, displaying data relating to the product, an image of which was captured.

14. The method according to claim 13, wherein, during the comparing, determining the quality of the image of the mark sensitive to copying, and thereafter
when the quality is higher than a predefined value, performing the comparing using an item of information representing the mark sensitive to copying, or
when the quality is not higher than the predetermined value, performing the comparing using an item of information representing the other part of the product.

15. A device for authenticating a product, the device comprising:
a means of capturing, on said product, an image of a mark robust to copying and a mark sensitive to copying with a higher resolution than the mark robust to copying, and another part of the product;
a means of transmitting an item of information representing the image of said mark robust to copying, said sensitive mark and said other part of the product;
a means of comparing said item of information representing the image of said mark robust to copying, said sensitive mark and said other part of the product with at least one remote memorized item of information; and
a means of displaying data relating to the product, an image of which was captured, depending on the result provided by the comparison means.

16. The device according to claim 15, wherein the comparison means is designed to determine the quality of the image of the mark sensitive to copying, and thereafter
when the quality is higher than a predefined value, performing a comparison using an item of information representing the mark sensitive to copying, or
when the quality is not higher than the predetermined value, performing a comparison using an item of information representing the other part of the product.

* * * * *